Patented Nov. 28, 1950

2,532,233

UNITED STATES PATENT OFFICE 2,532,233

DIHYDROXYDIPHENYL COCCIDIOSIS CONTROL COMPOSITION

Julius E. Johnson, Jr., Midland, and Dorsey R. Mussell, Clare, Mich., assignors to The Dow Chemical Company, Midland, Mich., a corporation of Delaware No Drawing. Application March 17, 1949, Serial No. 82,005

5 Claims. (Cl. 167—53.1)

This invention relates to the control of coccidiosis and is particularly directed to methods and compositions for the suppression of coccidial infection in poultry and the like.

Domestic fowl are subject to a number of different diseases. One of these diseases, coccidiosis, is caused by minute protozoan organisms known as coccidia. These parasites pass through certain stages of development away from the host organism and later complete their life cycle in the bodies of poultry.

The disease is spread by the contamination of the feed, water and soil with fecal droppings of fowl which harbor the parasites. The organisms have been widely distributed, being carried on or in grain sacks, running water and shoe soles, and by birds, flies and other insects which fly from one poultry yard to another. The ingestion of a single organism is capable of producing a mild form of the disease; the organism rapidly multiplying in the body of the fowl and later being spread to the entire flock through the ingestion of fecal droppings. Due to the great reproductive capacity of the coccidial organism and the ease with which the disease is spread, no poultry grower may ever feel free of the menace of this infection.

The coccidia invade and multiply in various organs, but particularly in the digestive tract of their host. During the process of growth and multiplication, they invade and erode the epithelial tissues of the cecum and small intestine, bringing about hemorrhage, weakness, digestive disturbances and emaciation. Birds, if they do not rapidly succumb to the infection, are rendered economically unfit by chronic forms of the disease.

As might be expected, numerous remedies have been suggested and made available for the suppression of coccidiosis. Their administration has usually been through the water or feed for the fowl. Certain of these materials have been of little efficacy, while others are too expensive or too toxic for prophylactic administration. One of the difficulties encountered in such administration has been the adverse effect which certain of the materials have upon metabolic activity. Another difficulty has been the poisoning of the blood-forming organs and a subsequent reduction in the number of red and white blood cells throughout the body. These effects have made the use of many remedies hazardous and unprofitable. The need for inexpensive prophylactic methods for the suppression of coccidial infection is well recognized, as the disease constitutes one of the major problems confronting the poultry industry.

According to this invention, we have discovered that coccidial infection in poultry may be suppressed by feeding the fowl a dihydroxydiphenyl having the formula

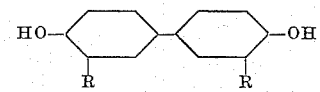

where R is a propyl, allyl or methallyl radical. These compounds are crystalline solids and inexpensive to prepare. They are not repellant to poultry and may be employed in admixture with the feed. They may be fed continuously or intermittently in dosages sufficient to suppress the development of infection without adversely affecting metabolic activity or imparting any unpalatable characteristic to the flesh of the fowl. The compounds are most effective in suppressing the disease when ingested prior to or within a reasonable time following exposure to infection.

Good results are obtained when each bird is fed daily from 150 to 700 milligrams of the substituted dihydroxydiphenyl per kilogram of body weight. The preferred dosage varies somewhat with the particular compound employed. When the compounds are administered with feeds, satisfactory results are obtained with medicated feeds containing from 0.1 to 1 per cent by weight of the agent.

A convenient mode of operation comprises dispersing a finely ground substituted dihydroxydiphenyl in the feed employed as a sole or part ration for the flock. The modified dihydroxydiphenyl may be dissolved in a small amount of an organic solvent such as acetone or methylene chloride, the resulting mixture dispersed in the feed, and the feed dried to remove the solvent. Also the dihydroxydiphenyl may be dissolved in an edible oil, such as coconut, olive, cottonseed or peanut oil, and the resulting solution dispersed in the feed. The dihydroxydiphenyl may be employed in combination with any commercial starting, growing or laying mash. Alternatively, the compounds, either alone or dispersed in a suitable non-toxic carrier, may be administered in the form of capsules or tablets.

The 3,3'-diallyl-4,4'-dihydroxydiphenyl and 3,3'-di(2-methallyl)-4,4'-dihydroxydiphenyl of this invention may be prepared by the molecular rearrangement of 4,4'-di(allyloxy)-diphenyl and 4,4'-di(2-methallyloxy)diphenyl, respectively, as described in the U. S. patent of E. C. Britton and John E. Livak, No. 2,229,010, issued January 14, 1941. This rearrangement is effected by heating the ether compound to a temperature above 225° C. but below the decomposition temperature for from 15 to 45 minutes. In practice, the ether is dissolved in from 0.5 to 1.0 part of an inert high-boiling solvent, such as diethyl aniline, and the resulting mixture heated at the boiling temperature and under reflux until the reaction is complete. The reaction product is then dissolved in an aqueous alkali-metal hydroxide, whereby an alkali-metal salt of the desired dihydroxydiphenyl compound is formed. The diethyl aniline is then separated from the mixture by extraction with an organic solvent, such as benzene, and the residue acidified with a dilute mineral acid to precipitate the desired free dihydroxydiphenyl compound as a white crystalline solid. The latter may be separated by filtration and further purified if desired by recrystallization from suitable organic solvents or solvent mixtures.

3,3'-dipropyl-4-4'-dihydroxydiphenyl may be prepared by the hydrogenation of 3,3'-diallyl-4,4'-dihydroxydiphenyl as described in the U. S. patent of Edgar C. Britton and John E. Livak, No. 2,260,739, issued October 28, 1941. The reaction is carried out by the direct addition of gaseous hydrogen under pressure to a solution of 3,3'-diallyl-4,4'-dihydroxydiphenyl in an inert solvent and in the presence of a hydrogenation catalyst, such as nickel. The reaction takes place quite readily at temperatures between 20° and 30° C. Upon completion of the reaction, the catalyst is filtered off and 3,3'-dipropyl-4,4'-dihydroxydiphenyl recovered directly from the reaction mixture.

The following examples illustrate the invention but are not to be construed as limiting.

*Example 1*

3,3'-dipropyl-4,4'-dihydroxydiphenyl (melting at 111° to 112.5° C.) having the formula

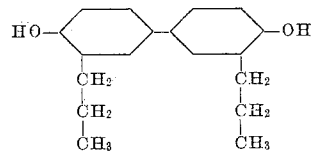

was ground through a screen having 0.295 millimeter square openings. This finely ground diphenol was mechanically dispersed in a commercial poultry starting mash to produce a composition containing 0.2 per cent by weight of the agent. This composition and the unmodified starting mash were fed as sole ration to two groups of chickens. Each group consisted of ten chickens which were two weeks of age. Group weights were obtained at the beginning and end of the experiment and the average per cent gain in weight determined for the treated and untreated controls. 24 hours after the initiation of the diet, 40,000 *Eimeria tenella* oöcysts were introduced directly into the crop of each bird. Seven days following the inoculation, the birds were sacrificed and autopsied. A cecal examination of each bird was carried out to determine the extent of cecal necrosis and a sample of cecal content was removed and examined microscopically for the presence or absence of oöcysts. The numerical ratings, 0, 1, 2, 4 and 8 were assigned both to the degree of necrosis and to the abundance of oöcysts in the cecum. The ratio of the summation of these ratings to the total number of observations carried out in the particular group of fowl gives the degree of infection present in the birds. A comparison between the degrees of infection of treated and untreated control groups serves as a basis for estimating the efficacy of the treatment, according to the follow formula $$\text{Index of efficacy} = \left(\frac{x-y}{x}\right)100$$

wherein $x$ represents the degree of infection of control birds and $y$ the degree of infection of treated birds. The numerical ratings, degrees of infection, index of efficacy, and average per cent gain in weight are recorded in the following table:

| | Chickens fed Modified Mash | Chickens fed Unmodified Mash |
|---|---|---|
| Chicken No. | 1-2-3-4-5-6-7-8-9-10 | 1-2-3-4-5-6-7-8-9-10 |
| Numerical rating of cecal necrosis | 2-0-0-0-0-0-2-0-4-2 | 8-8-4-8-8-4-4-4-8-8 |
| Numerical rating of abundance of oöcysts | 1-1-1-1-0-0-0-0-4-2 | 4-4-4-8-8-4-4-4-8-8 |
| Degree of infection in the group | 1.0 | 6.0 |
| Average per cent gain in weight | 66 | 48 |
| Index of efficacy | 83 | |

*Example 2*

A starting mash containing 0.3 per cent by weight of 3,3'-diallyl-4,4'-dihydroxydiphenyl (melting at 80° to 82° C.) having the formula

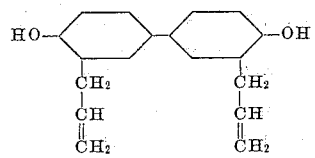

was prepared and tested with unmodified mash in a manner similar to that of Example 1. Each group of chickens employed consisted of 4 chickens which were two weeks of age. The mash containing the dihydroxydiphenyl was found to have an index of efficacy of 95. The average per cent gain in weight of the group receiving the modified mash was 47, while the average per cent gain in weight of the infected untreated control group was 28.

*Example 3*

A starting mash containing 0.3 per cent by weight of 3,3'-di(2-methallyl)-4,4'-dihydroxydiphenyl (melting at 97° to 97.5° C.) having the formula

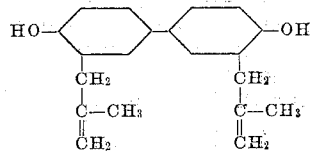

was prepared and tested with unmodified mash in a manner similar to that of Example 2. The mash containing the dihydroxydiphenyl was found to have an index of efficacy of 86. The average per cent gain in weight of the group receiving the modified mash was 57, while the average per cent gain in weight of the infected untreated control group was 10.

We claim:

1. A composition for the suppression of coccidial infection in fowl which comprises a poultry feed and dispersed therein as an active ingredient a dihydroxydiphenyl having a formula

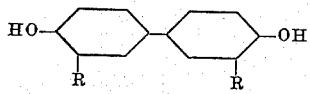

wherein R represents a member of the group consisting of the propyl, allyl and methallyl radicals.

2. A composition as defined in claim 1 wherein the dihydroxydiphenyl is present in the amount of from 0.1 to 1.0 per cent by weight of the composition.

3. A composition for the suppression of coccidial infection in poultry which comprises a poultry feed and dispersed therein as an active ingredient 3,3'-dipropyl-4,4'-dihydroxydiphenyl in the amount of from 0.1 to 1.0 per cent by weight of the composition.

4. A composition for the suppression of coccidial infection in poultry which comprises a poultry feed and dispersed therein as an active ingredient 3,3'-diallyl-4,4'-dihydroxydiphenyl in the amount of from 0.1 to 1.0 per cent by weight of the composition.

5. A composition for the suppression of coccidial infection in poultry which comprises a poultry feed and dispersed therein as an active ingredient 3,3'-di(2-methallyl)-4,4'-dihydroxydiphenyl in the amount of from 0.1 to 1.0 per cent by weight of the composition.

JULIUS E. JOHNSON, Jr.
DORSEY R. MUSSELL.

REFERENCES CITED

The following references are of record in the file of this patent:

UNITED STATES PATENTS

| Number | Name | Date |
|---|---|---|
| 2,229,010 | Britton | Jan. 14, 1941 |
| 2,260,739 | Livak | Oct. 28, 1941 |
| 2,279,421 | Tisdale | Apr. 14, 1942 |

OTHER REFERENCES

Journal of the American Chemical Society, vol. 56, page 2008 (1934). (Copy in Scientific Library.)